Figure 1:
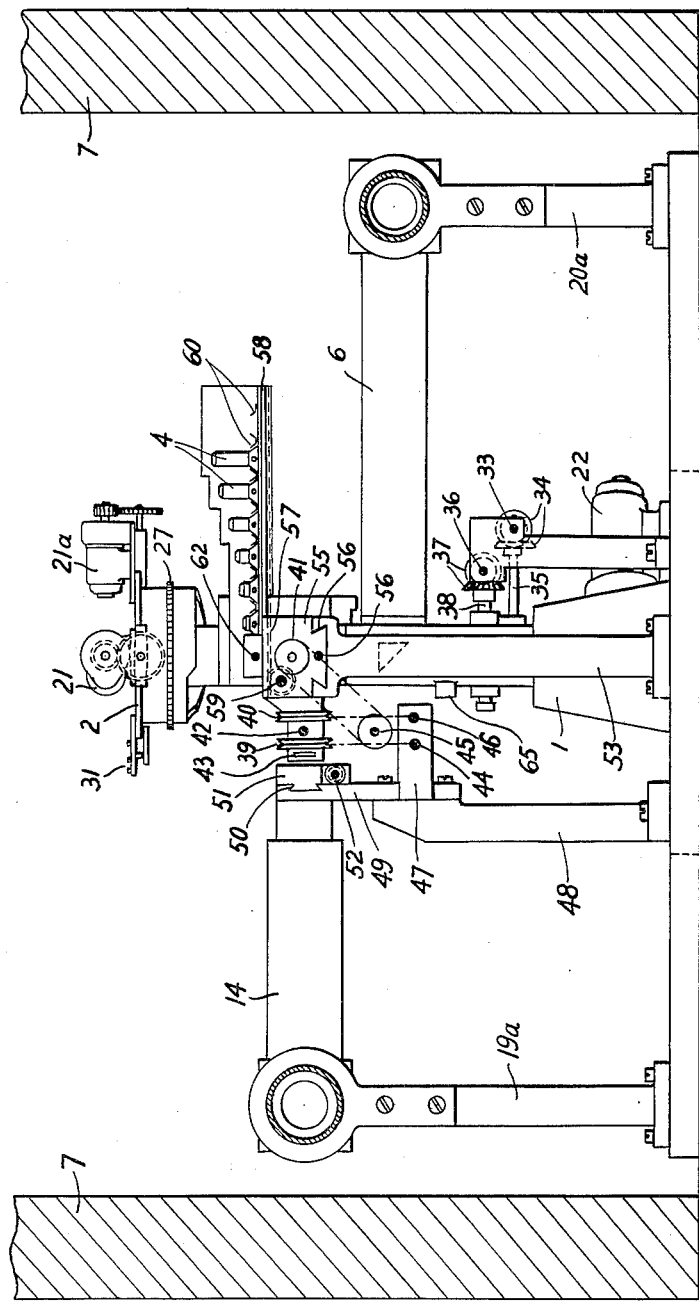

June 12, 1962 J. HUMEL 3,038,374
APPARATUS FOR MICROSCOPIC EXAMINATION
Filed Jan. 13, 1959 3 Sheets-Sheet 1

INVENTOR
Josef Humel
BY
Michael S. Striker
ATTORNEY

June 12, 1962  J. HUMEL  3,038,374
APPARATUS FOR MICROSCOPIC EXAMINATION
Filed Jan. 13, 1959  3 Sheets-Sheet 3

INVENTOR
Josef Humel

BY Michael S. Striker
ATTORNEY 3,038,374
APPARATUS FOR MICROSCOPIC EXAMINATION
Josef Hummel, Vienna, Austria, assignor to C. Reichert Optische Werke Aktiengesellschaft, Vienna, Austria
Filed Jan. 13, 1959, Ser. No. 786,592
Claims priority, application Great Britain Jan. 17, 1958
8 Claims. (Cl. 88—39)

In the microscopic examination of specimens which have a toxic emanation or emit radiation which is harmful to the human organism, such as X-rays, gamma or alpha rays, the viewer cannot approach the microscope as closely as is usual in the operation of this instrument. In this case a certain distance must be maintained between the microscope and the viewer and in most cases it is also necessary to provide a wall of plastics, lead or concrete for shielding the viewer. For this reason, means for a remote control of the microscope must be found.

Numerous remote control means, such as rope drives, rod arrangements, lever and gear-wheel transmissions and the like have been disclosed for specific individual functions, such as the change of the objective or specimen, the coarse or fine adjustment, the operation of the lifting device etc. Means of more universal character are gripping devices, with which not only one specific manipulation but different ones, such as the adjustment of a slide, turning of a lever and clamping of a screw can be performed.

In all cases, however, it remains difficult to control the illuminating device, on the one hand, and to view the microscopic image, on the other hand. This is so because the exchange and centering of an incandescent or gas discharge lamp is hardly possible even with a remotely controlled gripping instrument. The taking of a photograph directly at the microscope requires the expensive use of a television apparatus for the reasons stated above. Moreover, the previous types of mechanical and electrical means for transmitting power to all operating elements, which means have previously been improvised in most cases, involve disadvantages.

All these difficulties are overcome by the present invention, which relates to an apparatus which comprises a microscope which is provided with illuminating and viewing devices as well as remotely controlled control elements and is mounted in a chamber which is protected against an exit of radiation and/or gas, and which is characterized in that the illuminating device (light source and collector) and the viewing device (eyepiece, photographic or motion picture or television camera) are arranged outside the chamber and are in connection with the microscope by means of lens systems, one of which forms an image of the light source in the microscope and the other of which reproduces in the viewing device the intermediate image formed by the microscope objective, and that means for electrically and/or mechanically operating at least part of the control elements of the microscopes, preferably to the inclusion of the objective changing device, are provided outside the chamber.

It is particularly desirable to provide at least one lens system as a telescopic system, preferably with a magnifying power of 1. Moreover, the path of rays between the light source and the microscope and/or between the microscope and the viewing device may include, according to the invention, at least one angle.

In a development of the invention the operating means for the electrically operated control elements may consist of a switching and signalling device disposed outside the chamber whereas a member which is preferably rigidly connected to the microscope may be provided in the chamber for guiding or mounting the elements such as rods, levers, spindles etc. used for mechanically operating the control elements from the outside, e.g. for movement through a predetermined axial or angular range. More particularly, this guiding and mounting member may consist of an angle member which extends from the baseplate of the microscope.

According to another particularly preferred embodiment of the invention a control device which is particularly important in practice and is mechanically actuated from the outside, namely, the objective changing device, consists of a slide, known per se, which accommodates the several objectives and which is slidable in its transverse guide close to the microscope (and on the level of the receiving slot of the microscope for the objective which is in effective position) and which can be moved from and to the receiving slot of the microscope in a longitudinal guide.

According to the invention the ranges of the movement along the longitudinal and transverse guides of the objective changing device are limited by stops, whereas such an additional number of locked positions are provided for the transverse guide as objectives can be accommodated by the slide, one objective is in registry with the objective receiving slot of the microscope in each locked position.

An important feature of the invention resides finally in that a push rod is mounted in the transverse guide of the objective changing device and can be coupled in the respective locked position with the objective disposed before the objective receiving slot and permits of slidably moving the objective into and out of its effective position.

Figure 2:
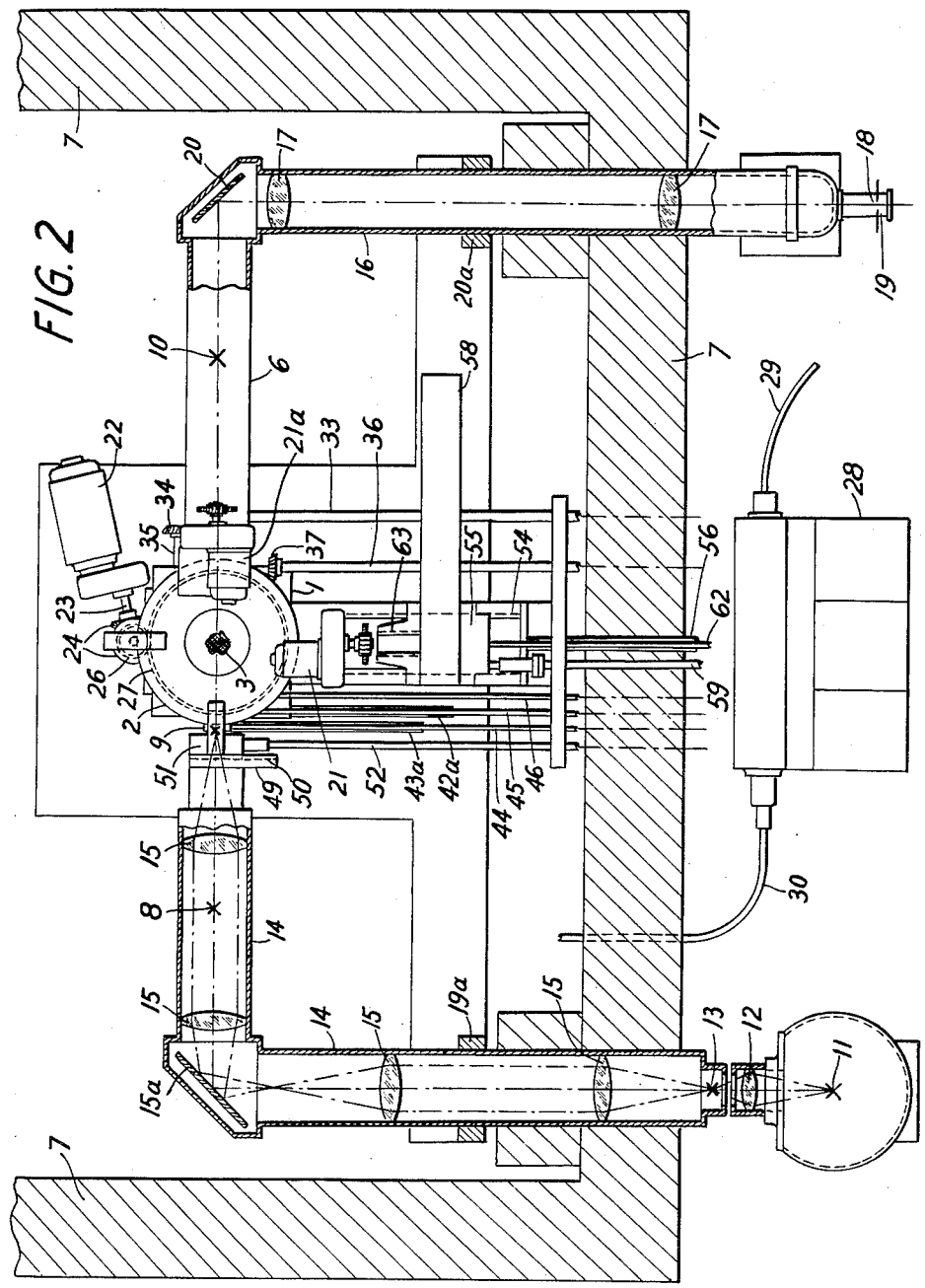
Figure 3:
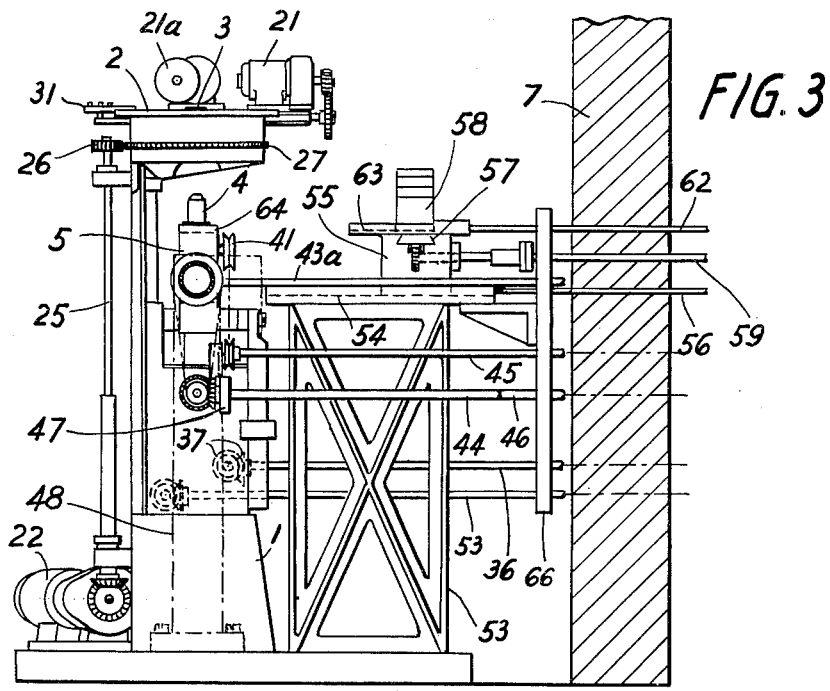
Figure 4:
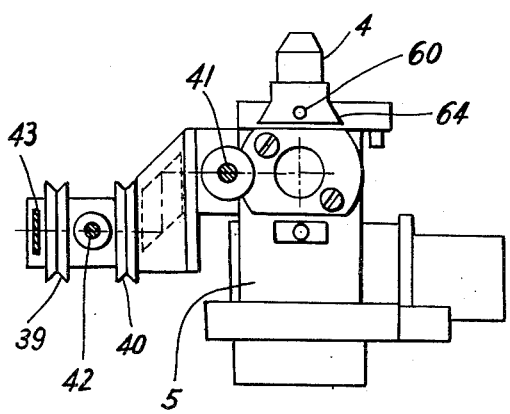

The invention will be described more fully hereinafter with reference to a non-restrictive embodiment shown in the accompanying drawing, in which FIG. 1 is an end view of a device with remote control for the examination in incident light including a microscope of the inverted type. FIG. 2 is a top plan view and FIG. 3 is a side elevation showing the same apparatus. FIG. 4 shows a detail of the illuminating device.

The microscope 1, of which the stage 2 with the specimen to be examined 3, the objective 4, the illuminating attachment 5 and the viewing tube 6 are shown, stands within the thick lead shield 7. In normal operation the light source at 8 and the collector (not indicated) of the illuminating device would produce an image of the light source at the entrance of the illuminating tube, e.g., at 9, whereas the microscopic image would be formed inside the viewing tube, e.g., at 10 and could be viewed there with the aid of an eyepiece, which can be slidably inserted in the tube 6. In the present case, however, the light source is disposed at 11 outside the lead shield. The collector 12 produces at 13 a real image of the light source. The optical transfer system accommodated in the tube 14 and consisting of four lenses 15 having the same focal distance and the deflecting mirror 15a is provided to transfer this image from 13 to 9. The lenses 15 are spaced from each other by twice their focal distance to form a telescopic system having a magnifying power of 1. This arrangement provides the same conditions of illumination as though the light source was disposed at 8 but the illuminating device disposed outside the lead shield can be controlled without difficulty. Even an exchange of lamps will not involve any complication.

In a similar arrangement as on the illumination side the microscopic image formed at 10 on the image-forming side is transferred by the intermediate optical system provided in the tube 16 and consisting of the two lenses 17 of equal focal distance, to 18 and is viewed, photographed or projected there, outside the lead shield 7, through the eyepiece 19. The two lenses are again spaced by twice their focal distance. Moreover, the rays are deflected by the mirror 20 so that the radiation emitted by the specimen 3 cannot pass out of the lead shield directly through the intermediate optical system which transfers the image. Two supports 19a and 20a serve to hold the tubes 14 and 16.

The means for moving the object in two mutually orthogonal directions by means of the microscope stage 2 consisting of a rotatable compound stage comprise two gearmotors 21 and 21a and a third motor 22, which is flanged to the spindle 23 and moves through the intermediary of a pair of bevel wheels 24, a telescopic screw 25 and a pinion 26 the stage by means of the gear rim 27 mounted thereon. The cables coming from the motors are united in the switchbox 28, which is disposed outside the lead chamber and is connected by a cable 29 to the mains. For the sake of clearness only the cable bundles 30 rather than the individual cables is shown. Three pairs of contacts provided for each of said three movements permit of an indication of the initial, final and intermediate positions in the range of movement (the rotary stage is rotatable through about 350°). One of these pairs of contacts is shown at 31. To close one of the final contact pairs the appertaining drive motor is automatically switched off by means of a relay. Together with the signal lamps which indicate the closing or opening of one of the contacts, the relays are accommodated in the switch box 28.

The coarse adjustment of the specimen is effected by lifting or lowering the stage, which is effected by turning the spindle 33, which operates through the pair of bevel wheels 34 the actual drive shaft 35 for the coarse adjustment. In a similar manner the fine adjustment is effected by the spindle 36 through the intermediary of the pair of bevel wheels 37 and the fine adjusting shaft 38, which acts in known manner on the position of the microscope objective 4. The illuminating attachment 5 (FIG. 4) contains the following control elements: The belt pulleys 39, 40 and 41 for controlling the aperture diaphragm, field diaphragm and bright- and dark-field diaphragms as well as the stub shaft 42, which controls the device for oblique illumination, and the slide 43 for the annular diaphragm aperture which must be inserted for phase contrast work. The three first-mentioned belt pulleys are operated by the shafts 44, 45 and 46 through the intermediary of pairs of bevel wheels and three additional belt pulleys by means of a rope drive. The shafts 44–46 themselves are rotatably mounted in a bracket 47, which is carried by the support 48 screwed to the baseplate of the microscope. The stub shaft 42 is rotated by means of the shaft 42a whereas the slide 43 is controlled by means of the push rod 43a. The same support 48 mounts an additional bracket 49, in the dovetail guide 50 of which a slide 51 is slidable, in which a polarizing element is rotatably mounted. Pulling the shaft 52 will move the slide 51 in its guide to move the polarizer into or out of the path of rays. The rotation of the polarizer is effected with the same shaft by means of a worm and worm wheel.

A support 53 which is fixedly screwed to the baseplate is arranged before the microscope. The slide 55 slides in the dovetail guide 54 of the support 53 and can be pushed by a push rod 56 towards and from the microscope. The slide 55 has an additional dovetail guide 57 in the direction at right angles to the guide 54, in which a second slide 58 can be traversed in front of the microscope with the aid of the shaft 59 by means of a pinion and rack. Each of the reserve objectives 4, which are screwed in small slides 60, is mounted in a spring-cushioned guide on this slide 58 and can be moved by means of the push rod 62 over the bridge 63 into the microscope itself, more particularly into the slot 64 of the illuminating attachment (cf. FIG. 4), when the slide 55 has been moved closely to the microscope. In order to enable the inserted objective to be pulled out of the slot 64, the objective slides 60 and the push rod 62 are provided with bayonet joints, which come into engagement upon rotation of the push rod 62. The slidable movement of the objectives with slides into and out of the illuminating attachment is possible only when the slot 64 and the bridge 63 are in registry on the same level. This requires a certain vertical position of the fine adjustment within a certain range. To indicate this position, a contact device 65 is provided, which causes a glow lamp on the switchbox 28 to light when the fine adjustment is in the desired position. Two additional contacts control two glow lamps in the switchbox, which indicate also the end positions of the fine adjustment.

Further elements which serve for controlling an analyzer required for observations in polarized light, an objective clamping device and the like are not shown in the drawings for the sake of clarity. These and all elements mentioned hereinbefore are disposed in such a manner that the appertaining control shafts or control rods are mounted in the bearing plate 66, which is affixed to the baseplate of the microscope. Extensions (not shown) may be connected to the free ends of these control elements and may extend outwardly through the lead chamber and may be provided outside the same with appropriate control handles.

It is obvious that the invention is not restricted to the embodiment described hereinbefore. The mechanical and electrical means may be varied in numerous ways. Where specimens are examined which emit only alpha radiation or a toxic emanation rather than gamma radiation, the lead wall may be replaced by an air-tight plexiglass cage. Both shields may be provided in combination for the examination of specimens emitting alpha and gamma radiation.

What is claimed is:

1. Apparatus for the microscopic examination of toxic substances, comprising, in combination, shielding means impermeable to toxic rays or gases; a microscope having a plurality of adjustable control parts, a viewing part, and an illuminating part, and being located on one side of said shielding means; a control station located on the other side of said shielding means and adapted to be operated by an operator, said control station including illuminating means having manually operated adjustable means, observation means adapted for inspection by the operator, and a plurality of control means adapted to be operated by the operator; a first optical system operatively connecting said illuminating means with said illuminating part, and having a part passing through said shielding means; a second optical system operatively connecting said viewing part with said observation means and having a part passing through said shielding means; and a plurality of connecting means for connecting each of said control means to one of said control parts, and passing through said shielding means, whereby an operator at said control station is protected from toxic rays and gases while operating the microscope during examination of a toxic substance.

2. An apparatus as set forth in claim 1 wherein said at least one of said optical systems forms a telescopic system having a magnifying power of 1.

3. An apparatus as set forth in claim 1 wherein said observation means is an ocular.

4. An apparatus as set forth in claim 1 wherein said connecting means include servo-motor means operatively connected to said control parts of said microscope, and electrical connector means passing through said shielding means; and wherein said control means at said control station are switch means for operating said servomotor means.

5. An apparatus as set forth in claim 4 and including indicating means connected to and controlled by at least one of said control parts and located on said other side of said shielding means at said control station to indicate at least one condition of at least one control part to the operator.

6. An apparatus as set forth in claim 1 wherein said microscope includes a holder adapted to receive exchangeable objectives; and including support means on said one side of said shielding means for supporting a plurality of objectives and being movable between a plurality of positions for placing selected objectives in said holder; and other control means at said control station operatively connected to said support means for shifting the same between said positions whereby the operator is capable of exchanging the objective of the said microscope.

7. Apparatus for the microscopic examination of toxic substances, comprising, in combination, shielding means impermeable to toxic rays or gases; a microscope having a plurality of adjustable control parts, a viewing part, and an illuminating part, and being located on one side of said shielding means; a control station located on the other side of said shielding means and adapted to be operated by an operator, said control station including illuminating means having manually operated adjustable means, observation means adapted for inspection by the operator, and a plurality of control means adapted to be operated by the operator; a first optical system operatively connecting said illuminating means with said illuminating part, and having a part passing through said shielding means; a second optical system operatively connecting said viewing part with said observation means and having a part passing through said shielding means, said second optical system including a deflection element for deflecting rays of light through an angle, while being permeable to rays emitted by the toxic substance; and a plurality of connecting means for connecting each of said control means to one of said control parts, and passing through said shielding means, whereby an operator at said control station is protected from toxic rays and gases while operating the microscope during examination of a toxic substance.

8. Apparatus for the microscopic examination of toxic substances, comprising, in combination, shielding means impermeable to toxic rays or gases; a microscope having a plurality of adjustable control parts, a viewing part, and an illuminating part, and being located on one side of said shielding means; a control station located on the other side of said shielding means and adapted to be operated by an operator, said control station including illuminating means having manually operated adjustable means, observation means adapted for inspection by the operator, and a plurality of control means adapted to be operated by the operator; a first optical system operatively connecting said illuminating means with said illuminating part, and having a part passing through said shielding means, said first optical system including a deflecting element for deflecting rays of light through an angle while being permeable to rays emitted by the toxic substance; a second optical system operatively connecting said viewing part with said observation means and having a part passing through said shielding means; and a plurality of connecting means for connecting each of said control means to one of said control parts, and passing through said shielding means, whereby an operator at said control station is protected from toxic rays and gases while operating the microscope during examination of a toxic substance.

References Cited in the file of this patent

UNITED STATES PATENTS

| 1,943,510 | Bauersfeld et al. | Jan. 16, 1934 |
| 2,206,180 | Gerstenberger et al. | July 2, 1940 |
| 2,705,490 | Littmann | Apr. 5, 1955 |

FOREIGN PATENTS

| 3,459 | Great Britain | of 1912 |
| 103,445 | Austria | May 25, 1926 |
| 82,382 | Sweden | Jan. 15, 1935 |